United States Patent [19]

Yeh

[11] Patent Number: 5,398,181
[45] Date of Patent: Mar. 14, 1995

[54] CONTROL SYSTEM AND METHOD FOR A MINIMIZING POWER LOSS IN TRANSFORMER

[75] Inventor: Thomas I. Yeh, Penfield, N.Y.

[73] Assignee: Xerox Corporation, Stamford, Conn.

[21] Appl. No.: 215,142

[22] Filed: Mar. 21, 1994

[51] Int. Cl.$^6$ ............................................. H02N 3/335
[52] U.S. Cl. ....................................... 363/21; 363/97; 363/131
[58] Field of Search ..................... 363/20, 21, 97, 131

[56] References Cited

U.S. PATENT DOCUMENTS 3,337,787  9/1964  Joseph ................................. 363/59
4,866,589  9/1989  Satoo et al. ........................ 363/21

Primary Examiner—A. D. Pellinen
Assistant Examiner—Y. J. Han
Attorney, Agent, or Firm—R. Hutter

[57] ABSTRACT

A system controls a transformer having a primary coil. A pulse is applied to an inverter associated with the primary coil, whereby a leading edge of the pulse creates in the primary coil a tank circuit current of an initial polarity in a tank circuit inherent to the transformer. The tank circuit is seen from an effective inductance in series with the primary coil, the effective inductance including a leakage inductance of the primary coil, and an effective capacitance in parallel with the primary coil, the effective capacitance including a parasitic capacitance of the transformer. A trailing edge of the pulse occurs when the tank circuit current is different from the initial polarity.

10 Claims, 4 Drawing Sheets

CONTROL SYSTEM AND METHOD FOR A MINIMIZING POWER LOSS IN TRANSFORMER

BACKGROUND OF THE INVENTION

1. Field of the Invention

The present invention relates to a control system for the operation of a transformer, such as would be found in, for example, an electrophotographic printer.

In machines wherein a wide range of voltages are required simultaneously, the safe and efficient use of transformers represents a significant design problem. In an electrophotographic printer, the various electronic elements may operate at ranges including 5 volts for digital control circuits, 110 volts for motors, and as much as 1000 volts for charging devices. Various transformers are typically required in making such voltages available from an original power source. With a step-up or step-down transformer, however, there are well-known problems of efficiency and safety. Whenever induction coils are used, enormous incidental voltages can result within the system because of the relationship $V = L\, di/dt$; the rapid switching of, for example, a digitally-controlled inverter may create very small values of $dt$, which results in a very high value of $di/dt$, in turn resulting in uncontrollably high voltage spikes. These voltage spikes can, of course, create arcing and consequential damage to the circuit and the machine. There is therefore a need for control systems which facilitate manageable control of the power associated with transformers.

2. Description of the Prior Art

U.S. Pat. No. 3,894,280 discloses a transformer in combination with a push-pull transistor switch which forms the inverter of a DC to DC converter. A controllable current source responsive to the converter output voltage controls the charging of a timing capacitor which upon reaching a threshold value causes termination of each inverter half-cycle.

U.S. Pat. No. 4,710,859 discloses a DC converter in which a switching transistor forming the inverter for a transformer is controlled by tuning an oscillating circuit. By tuning this oscillating circuit, the switching transistor off time and duty cycle is varied within large ranges.

U.S. Pat. No. 4,785,387 discloses a transformer having a characteristic leakage inductance. A capacitor of a characteristic capacitance is coupled to the secondary coil to form a resonant circuit including the leakage inductant of the transformer and the capacitor. A rectifying circuit couples the capacitor to a load whereby the voltage stored in the capacitor is delivered to the load.

U.S. Pat. No. 4,868,729 discloses a power supply unit for an electrostatic printing apparatus. A transformer is driven by a drive circuit having a pulse generator and produces a high voltage in the course of decay of a pulse. An output of a secondary winding of the transformer is detected to control the drive circuit such that the output of the secondary winding is kept at a constant level. A discrete capacitor is placed in series with the primary coil of the transformer to form a series-resonant tank circuit; as seen in FIG. 4 of the patent, the effect is to create a sinusoidal voltage behavior and a ramp current behavior with each switching pulse.

U.S. Pat. No. 4,920,471 discloses a high voltage AC power supply which includes a sinusoidal transformer having a high turn winding and a sampling circuit on its secondary side for sampling voltage proportional to the load current. The sampled voltage is compared to a reference voltage and the error voltage is supplied to a buck regulator. The buck regulator converts the error voltage to a variable DC voltage which is fed to an oscillator formed by the primary winding of the transformer.

U.S. Pat. No. 5,003,230 discloses a fluorescent lamp controller with an isolation transformer. The controller applies the high frequency current to the primary winding of the transformer. The secondary winding is coupled to a control input via loading circuitry. A detector circuit supplies the signal from the lamp controller indicative of the results of loading of the transformer to control lamp intensity.

U.S. Pat. No. 5,111,118 discloses a controller for a half-bridge DC/AC converter in a frequency range which is offset from a resonant frequency of an output circuit which includes a transformer and capacitor and which couples the converter to a fluorescent lamp load.

U.S. Pat. No. 5,274,704 discloses a transformer having first, second and third windings. The input to which a signal receiving line is connected is an inverting input, and a first resistor is connected in series between the receive line and the inverting input. The third winding is connected in series with a second resistor to form a feedback loop which is connected to the inverting input of the amplifier. The transfer function of the interface circuit which includes the transformer is dependent on the ratio of the resistances of the first and second resistors and the turns ratio of the first winding to the third winding but is intended to be substantially independent of transformer parasitics.

SUMMARY OF THE INVENTION

According to the present invention, there is provided a method for controlling a transformer having a primary coil, the transformer defining an inherent tank circuit as seen from an effective inductance in series with the primary coil including a leakage inductance of the primary coil, and an effective capacitance in parallel with the primary coil including a parasitic capacitance of the transformer. A pulse is applied to an inverter associated with the primary coil, whereby a leading edge of the pulse creates in the primary coil a tank circuit current of an initial polarity, and a trailing edge of the pulse occurs in response to the tank circuit current being of a polarity different from the initial polarity.

According to another aspect of the present invention, there is provided a system for controlling a transformer having a primary coil, the transformer defining an inherent tank circuit as seen from an effective inductance in series with the primary coil including a leakage inductance of the primary coil, and an effective capacitance in parallel with the primary coil including a parasitic capacitance of the transformer. An inverter causes power to be applied to the primary coil in response to a signal. Means are provided for applying a signal in a form of a pulse to the inverter, whereby a leading edge of the pulse creates in the primary coil a tank circuit current of an initial polarity, and a trailing edge of the pulse occurs in response to the tank circuit current being of a polarity different from the initial polarity.

DESCRIPTION OF THE PREFERRED EMBODIMENT

Prefatory to a general discussion of the operation of the circuit of the present invention, the following terms shall be defined, for use in both the specification and claims herein:

"Leakage inductance" is the series inductance associated with the transformer, corresponding to magnetic flux lines produced by one coil of the transformer which are not coupled to other coils of the transformer.

"Winding capacitance" is the parasitic capacitance exhibited between the turns of any coil.

"Winding inductance" is the inductance of a coil of the transformer.

"Self-resonant frequency," or "SRF," is the resonant frequency of a theoretical tank circuit formed by the winding inductance and winding capacitance of a transformer.

"Parasitic resonance" is the resonant frequency of a theoretical tank circuit formed by the leakage inductance and the winding capacitance of a transformer.

Figure 1:
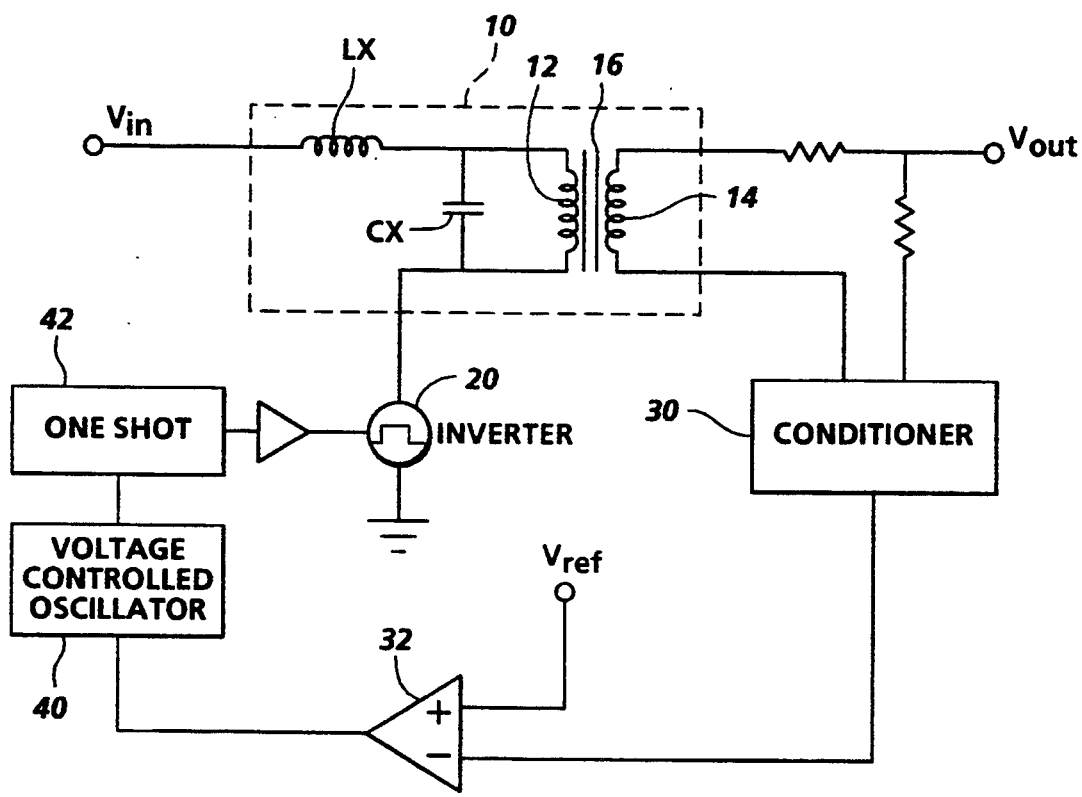
FIG. 1 is a simplified systems view of a transformer and the elements, of a control system according to the present invention.

FIG. 1 is a simplified circuit-systems view of a transformer and the elements of a control system according to the present invention. The transformer being controlled is indicated generally as 10. As is familiar in the art of transformers, the transformer 10 includes a primary coil 12, and a secondary coil 14, which may be coupled, as is known in the art, by a core 16. As can be seen in the Figure, the primary coil 12 of transformer 10 is connected to an input voltage $V_{in}$, and the secondary coil 14 is connected to a voltage out $V_{out}$. The other end of the primary coil 12 connects to ground through an inverter 20. Inverter 20 is adapted to cause power to be applied to the primary coil, by completing the path between the input voltage and ground, in response to an external signal. As is known in the art of transformers, a DC voltage is inverted into AC by periodic switching to operate the transformer. As will be described in detail below, inverter 20 will have associated therewith a signal input in the form of a pulse train, having its own frequency and pulse width.

Also shown in FIG. 1 is a leakage inductance LX, and a parasite, or winding, capacitance CX. For the purpose of understanding the present invention, this leakage inductance LX and winding capacitance CX are not in the form of discrete circuit elements, as shown, but are rather inherent to the behavior of the transformer 10 as a whole. In physical terms, the parasitic capacitance CX is abstracted from all of the capacitances between the individual turns within the primary coil 12; that is, the individual capacitances between turns in the coil 12 can be thought to "add up" to a single winding capacitance CX. Similarly, the leakage inductance LX represents the excess magnetic flux lines produced by one of the coils in the transformer 10, but which are not coupled to the other coil in the transformer. In step-up or step-down transformers, wherein there is a deliberate difference between the number of turns in the primary and secondary coils, this leakage inductance will have a noticeable effect. Together, the leakage inductance LX and the winding capacitance CX form, as shown, an inherent LC "tank circuit," with a parasitic resonance, which is inherent in the transformer 10 itself.

As is well known, the presence of inductors, whether within a transformer, or by themselves, may lead to very high voltages when combined with fast switching, such as in a digital system. The voltage associated with an inductor is given as $V = L\, di/dt$. Thus, a square wave applied to the inverter 20, such as created by a one-shot or switching circuit, will cause abrupt changes in current as the current is switched on and off by the inverter 20. These very steep changes will result in a very fast change in current over time, which is defined as $di/dt$, which in turn results in very high voltages associated with any inductor. In the case of the leakage inductance LX which is inherent to the transformer 10, the abrupt changes in current will cause voltage spikes. These voltage spikes at every turn-on and turn-off of the inverter 20 either represent a waste of energy for the power "under" the voltage represented by the spikes, or more likely will result in arcing and damage to the machine as a whole. There is therefore an advantage to be had in minimizing these voltage spikes. One way of doing this is, instead of lowering the value of di, increasing the denominator dr; in practical terms, voltage spikes can be avoided by "softening" the on-and-off transitions over time associated with the inverter 20. If the effective behavior of the inverter 20 (as seen from the primary coil) is sinusoidal, the value of the derivative of a sinusoidal will merely be another sinusoidal, the derivative of a sine curve being a cosine curve. The system of the present invention obtains this soft current change by exploiting the resonant frequency of the implied tank circuit created by the leakage inductance LX and the winding capacitance CX which are inherent to the transformer 10.

The system elements shown external to the transformer 10 in FIG. 1 represent the elements of the control system which carries out the present invention. As can be seen, the two ends of the secondary coil 14, in addition to being connected to the output voltage $V_{out}$, are also connected to what is here called a "conditioner" 30. The purpose of conditioner 30, as will be explained in detail below, is to take one measurable output from the secondary coil 14, either the voltage or current as desired by the designer of the system, and derive therefrom a representative signal which may relate to one of these parameters as desired. As such, the electronic function of the conditioner 30 is to amplify, buffer, and/or filter a raw output from secondary coil 14, or else output a synthetic signal derived from the measured output. The "clean" output from conditioner 30 is typically in the form of a reasonably constant voltage which can in turn be compared to a reference voltage $V_{ref}$ in a comparator 32. This reference voltage $V_{ref}$ is representative of a desired output (current or voltage) of the transformer 10. The error signal output from comparator 32 is then sent to a voltage-controlled oscillator 40, which outputs a wave having a frequency related to the error signal into a one-shot 42. This one-shot 42 in turn controls the switching of the inverter 20, resulting in an overall system in which a detected error in the output of the transformer 10 creates a change in the frequency of switching by the inverter 20, which controls the current in the primary coil 12 and ultimately the output of the transformer 10.

Figure 2:
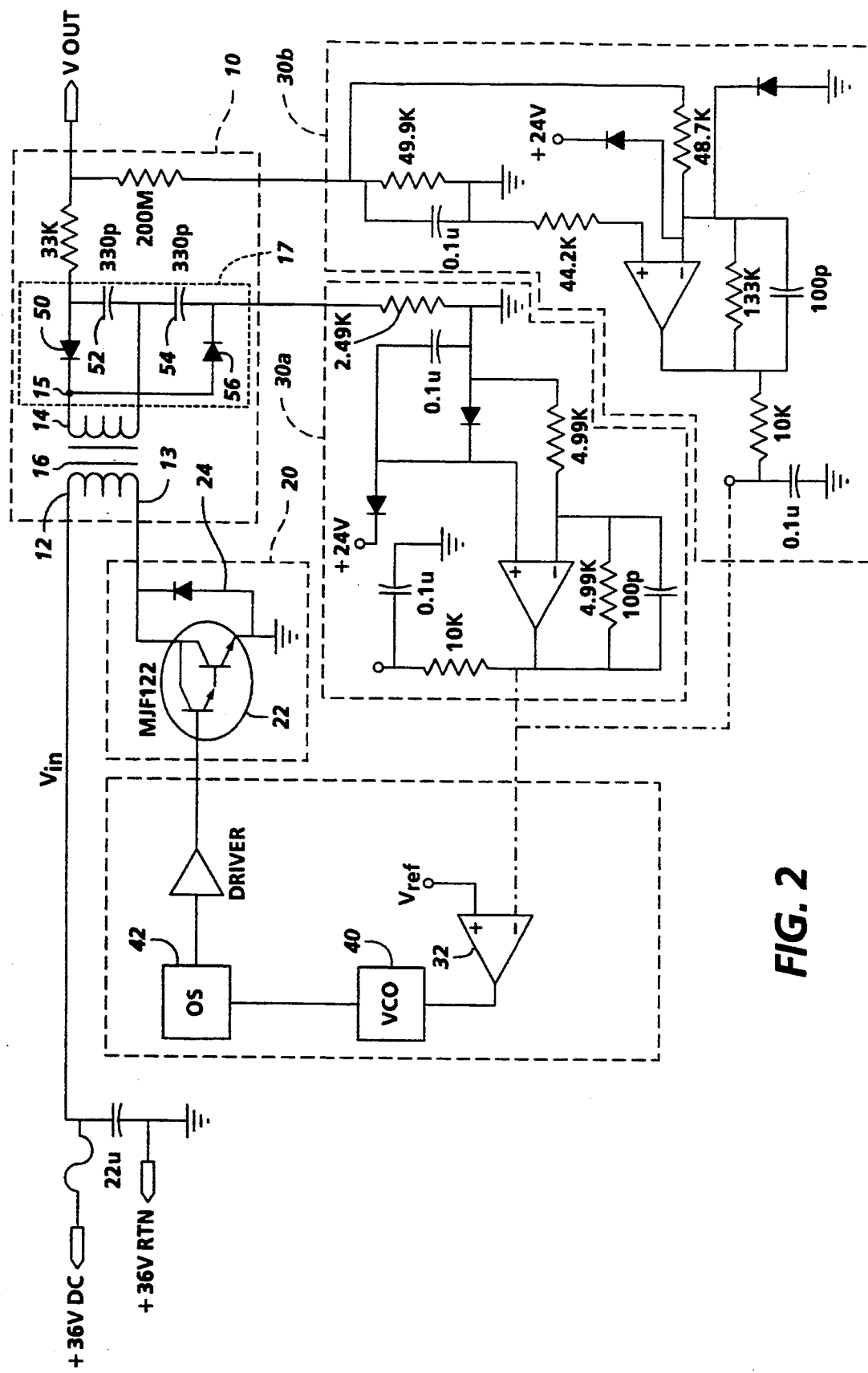
FIG. 2 is a detailed view of the control system according to a practical implementation of the present invention.

FIG. 2 is a more detailed view of the control system of the present invention in use with a transformer, according to a practical implementation of the present invention. As can be seen, inverter 20 is in the form of a two-stage transistor in combination with a diode. Further, the conditioner generally indicated as 30 in FIG. 1 is here shown in two parts, a current conditioner generally indicated as 30a and a voltage conditioner generally indicated as 30b. It is the intention in the embodiment of FIG. 2 that one or both of the current conditioner 30a or voltage conditioner 30b can ultimately be connected to comparator 32 to be compared with a reference voltage. This reference voltage can represent an ideal current output or an ideal voltage output; a designer of a system can chose either current conditioner 30a or voltage conditioner 30b, depending on whether current or voltage is desired to be controlled, and connect that particular circuit to the comparator 32.

In brief, the function of the control system of the present invention is to apply, within certain frequency constraints, an inverted current to the primary coil 12 of the transformer 10, which is related to the inherent tank circuit which is associated with the transformer itself. As mentioned above, the transformer 10 will have associated therewith a theoretical tank circuit formed by the winding inductance of the primary coil 12, and the winding capacitance of the transformer as a whole. According to the present invention, there is applied by the inverter 20 a drive signal having a frequency greater than the self-resonant frequency of the transformer, but less than the parasitic resonance of the transformer. The intention is to convert the traditionally undesirable parasitic elements of a transformer to advantageous use.

The technique of the present invention exploits the resonance caused by the leakage inductance and winding capacitance of the transformer to shape the switching current of the inverter to be essentially sinusoidal. The key elements of inverter 20 are a transistor 22, which acts as a switch for applying power to primary coil 12 when a signal is applied to its base, and an anti-parallel diode 24. Since the transistor 22 of the inverter 20 turns on at zero current and is self-commutated at zero current, no power is dissipated during the switching of the transistor. The energy is delivered to the load of the transformer by extracting the energy from the series-resonant tank circuit formed by the leakage inductance $L_X$ and the winding capacitance $C_X$. The voltage across the winding capacitance $C_X$ is stepped up by the transformer action into a suitable high voltage output.

As shown in FIG. 2, there may also be associated with the transformer 10 a voltage doubler, in the form of a set of capacitors and diodes generally indicated as 17, which can provide additional step-up ratio. Output capacitor 52 is charged to the stepped-up peak voltage of the winding capacitance $C_X$ of the transformer when terminal 15 of the transformer 10 is negative with respect to the terminal 13. The output capacitor 54 is charged up to the stepped-up peak voltage of the winding capacitance $C_X$ when the terminal 15 is positive with respect to the other terminal 13. The output voltage is the sum of the voltage across capacitors 52 and 54.

Figure 3:
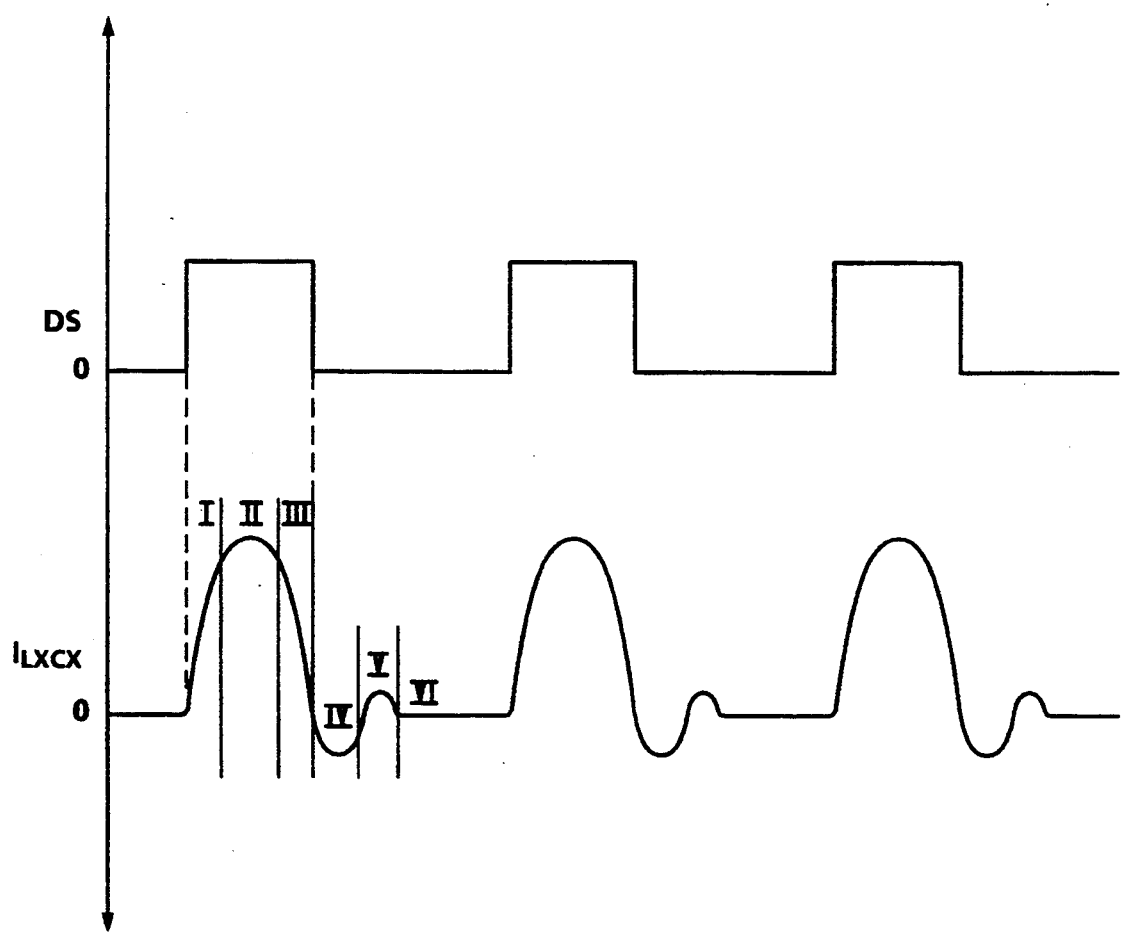
FIG. 3 is a graph comparing the behavior of a drive signal, simultaneous with the current associated with tank circuit inherent to a transformer.

In the following paragraphs the details of operation of the system of the present invention will be disclosed. FIG. 3 is a graph, based on an actual tested circuit comparing the behavior of a drive signal, indicated as DS, applied to the base of transistor 22 (shown in the upper portion of the graph), simultaneous with the current $I_{LXCX}$ associated with the tank circuit inherent to transformer 10 (in the lower portion of the graph). The drive signal is in the form of a square wave, having a pulse width associated therewith, as would be produced by a one-shot such as 42. The operation of the proposed technique is best understood when the switching cycle is divided into six stages of operation, as shown in the Figure.

In stage I, when the transistor 22 associated with inverter 20 receives a drive signal from one shot 42, the voltage across the transistor 22 will collapse and be near ground. The input $V_{in}$ is impressed across the primary coil 12. The initial voltage on the winding capacitance $C_X$ is equal to the voltage across output capacitor 54, reflected into primary coil 12. Stage I terminates when the current in secondary coil 14 is of sufficient value to overcome the current from diode 56 reflected into the primary coil 12; as shown in FIG. 3, stage I ends when the tank circuit current behavior changes from linear to sinusoidal, as shown.

In stage II, the voltage across the capacitance $C_X$, the primary winding voltage, is made positive and causes the diode 50 to conduct. Thus, in stage II the leakage inductance $L_X$ and winding capacitance $C_X$ form the resonant tank circuit. During the positive cycle, this current associated with the tank circuit is conducted to the transistor 22 of inverter 20. As shown in FIG. 3, in stage II the tank circuit current exhibits sinusoidal behavior and soon heads downward.

In stage III, the current in primary coil 12 is decreasing in a substantially linear manner. When the current associated with the tank circuit becomes negative, the transistor 2—2 is self-commutated off and the anti-parallel diode 24 is commutated on. As long as the drive signal pulse width is longer than the tithe when the tank circuit current is in its positive phase, the transistor 22 is turned off because of self-commutation, and therefore no switching power is dissipated with the turning off. Since the transistor 22 is turned on in zero current during stage I, and turned off at zero current at the end of stage III, lossless switching is accomplished. The drive signal to the base of transistor 22 must be terminated when the current associated with the tank circuit is zero or negative. However, the pulse width to the base of transistor 22 can be longer than a full resonant cycle of the tank current provided that the pulse is terminated while the tank current is negative.

In stage IV, the current associated with the tank circuit is at zero, having gone through its positive and negative phases. The voltage across the winding capacitance $C_X$ discharges into the transformer 10 as a whole and is reflected into the secondary coil 14. Stage IV ends when the current in the primary coil 12 resonates to zero and the transistor 22 of inverter 20 switches off.

Stage V represents the "flyback" of voltage across the transformer after the current in primary coil 12 reaches zero.

In stage VI, the tank circuit is in a quiescent state, where the current associated with the leakage inductance $L_X$ remains at zero, and the voltage across the winding capacitance is clamped to the reflected voltage on capacitor 54.

Figure 4:
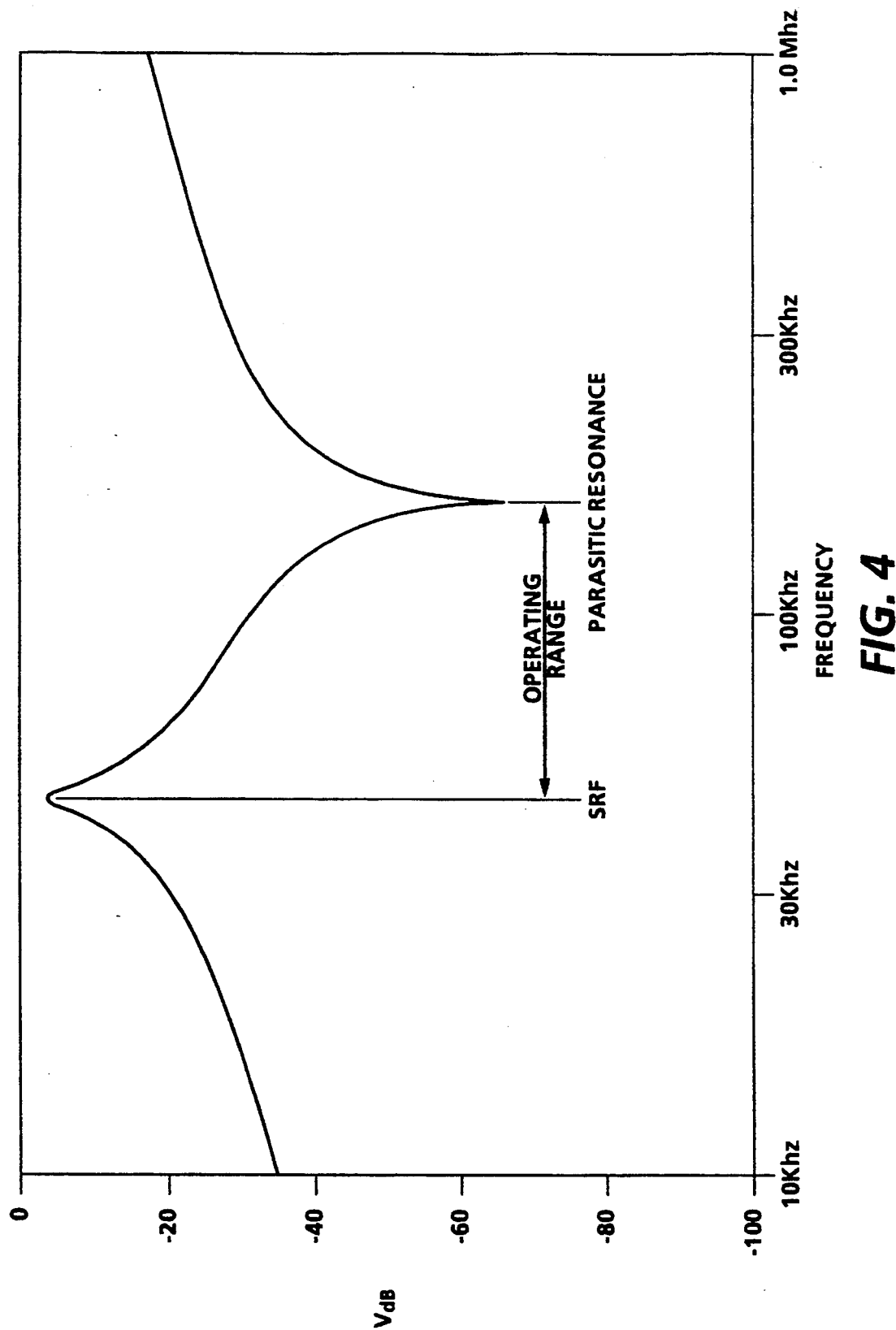
FIG. 4 is a graph illustrating a typical frequency response of a transformer controlled by the system of the present invention.

In order for the desirable effects of the control system of the present invention to be apparent, the drive pulses to inverter 20 must be within an operating range greater than the self-resonant frequency of the transformer, but less than the parasitic resonance of the transformer. Within this range, however, there is ample room for control of the output amplitude of the transformer. FIG. 4 shows how the operating range of a transformer controlled by the system of the present invention can make useful adjustments in the output amplitude of the transformer by means of altering the drive frequency by which the inverter 20 is operated to change the frequency of the current pulses applied to the primary coil 12. If the pulses are of a frequency close to the self-resonant frequency, the output voltage will peak at a minimum as shown, whereas the output voltage will increase as the frequency of pulses reaches the parasitic resonance, where another discontinuity results.

In discussing the frequency of pulses applied in a pulse train, it should be remembered that the inherent tank circuit in the transformer 10 does not change when different frequencies of pulses are applied to the primary coil; rather, the behavior of the transformer itself changes as the applied pulses interact with the inherent characteristics of the tank circuit. Regardless of the frequency of pulses applied, it is intended that the pulse width of each pulse remain in a condition whereby the trailing edge of each pulse occurs when the current in the primary coil is zero or of a polarity opposite that of its initial polarity when the pulse is first applied. One caveat to designing such a system is that, as shown for example in FIG. 3, the "zero" level for the tank circuit current may not pass right through the center of the sine curve, so that the zero point may not occur at the exact half-wavelength point of the curve. It will be apparent that, returning to the control system of FIGS. 1 and 2, this property of adjusting the voltage or current amplitude can be harnessed to a feedback control system, wherein, when a sample current or voltage is measured, the voltage signal representative of this current or voltage is compared to a reference voltage, and then used to control the frequency of pulses applied to the primary coil.

Although, in the illustrated embodiment of the present invention, the system exploits a tank circuit which is entirely inherent to the transformer being controlled, it should be emphasized that a control system and method according to the present invention can be designed to exploit the resonance properties of any circuit including a transformer, if a series inductance with the primary coil or a parallel capacitance with the transformer is taken into account. Thus, if it is desired to add discrete circuit elements around the transformer, and if these added discrete circuit elements have the effect of contributing to the effective values of CX or LX as shown in FIG. 1, a system could designed according to the present invention to control an output of the transformer and its associated elements. Nonetheless, the effective series inductance and effective parallel capacitance will include the CX and IX which are inherent to the transformer itself.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A method of controlling a transformer having a primary coil, the transformer defining an inherent tank circuit as seen from an effective inductance in series with the primary coil including a leakage inductance of the primary coil, and an effective capacitance in parallel with the primary coil including a parasitic capacitance of the transformer, comprising the step of:

applying a pulse to an inverter associated with the primary coil, a leading edge of the pulse creating in the primary coil a tank circuit current of an initial polarity, and a trailing edge of the pulse occurring in response to the tank circuit current being of a polarity different from the initial polarity.

2. The method of claim 1, comprising the step of applying to the inverter a pulse of a width not less than a duration in the initial polarity of a resonant frequency of the inherent tank circuit.

3. A method of controlling a transformer having a primary coil, the transformer defining an inherent tank circuit as seen from an effective inductance in series with the primary coil including a leakage inductance of the primary coil, and an effective capacitance in parallel with the primary coil including a parasitic capacitance of the transformer, comprising the step of:

applying to an inverter associated with the primary coil a plurality of pulses with a frequency greater than a self-resonant frequency of the transformer and less than a parasitic resonance of the transformer, a leading edge of each pulse creating in the primary coil a tank circuit current of an initial polarity, and a trailing edge of the pulse occurring in response to the tank circuit current being of a polarity different from the initial polarity.

4. The method of claim 3, further comprising the steps of:

measuring an output from a secondary coil of the transformer;

comparing a measured output from the secondary coil to a reference signal representative of a desired output, to yield an error signal; and varying the frequency of pulses applied to the inverter in response to the error signal.

5. The method of claim 3, further comprising the step of maintaining the pulses at a fixed pulse width.

6. A system for controlling a transformer having a primary coil, the transformer defining an inherent tank circuit as seen from an effective inductance in series with the primary coil including a leakage inductance of the primary coil, and an effective capacitance in parallel with the primary coil including a parasitic capacitance of the transformer, comprising:

an inverter, adapted to cause power to be applied to the primary coil in response to a signal; and means for applying a signal in a form of a pulse to the inverter, a leading edge of the pulse creating in the primary coil a tank circuit current of an initial polarity and a trailing edge of the pulse occurring in response to the tank circuit current being of a polarity different from the initial polarity.

7. The system of claim 6, wherein the transformer includes a secondary coil, and further comprising a voltage doubler associated with the secondary coil of the transformer.

8. The system of claim 6, wherein the inverter comprises a switch for applying power to the primary coil, and a diode connected in parallel with the switch.

9. A system for controlling a transformer having a primary coil, the transformer defining an inherent tank circuit as seen from an effective inductance in series with the primary coil including a leakage inductance of the primary coil, and an effective capacitance in parallel with the primary coil including a parasitic capacitance of the transformer, comprising:

an inverter, adapted to cause power to be applied to the primary coil in response to a signal; and means for applying to the inverter a signal in a form of a plurality of pulses with a frequency greater than a self-resonant frequency of the transformer and less than a parasitic resonance of the transformer, a leading edge of each pulse creating in the primary coil a tank circuit current of an initial polarity and a trailing edge of the pulse occurring in response to the tank circuit current being of a polarity different from the initial polarity.

10. The system of claim 9, wherein the transformer includes a secondary coil, further comprising:

means for measuring an output from the secondary coil of the transformer;

means for comparing the measured output from the secondary coil to a reference signal representative of a desired output, to yield an error signal; and means for varying the frequency of pulses applied to the inverter in response to the error signal.

* * * * *